United States Patent
Kakemizu (10) Patent No.: US 7,170,048 B2
(45) Date of Patent: Jan. 30, 2007

(54) COMPOUND SCANNING PROBE MICROSCOPE

(75) Inventor: Takahiko Kakemizu, Hachioji (JP)

(73) Assignee: Olympus Corporation, Tokyo (JP)

( * ) Notice: Subject to any disclaimer, the term of this patent is extended or adjusted under 35 U.S.C. 154(b) by 92 days.

(21) Appl. No.: 11/142,714

(22) Filed: Jun. 1, 2005

(65) Prior Publication Data

US 2005/0269495 A1    Dec. 8, 2005

(30) Foreign Application Priority Data

Jun. 8, 2004    (JP) ............................ 2004-169961

(51) Int. Cl.
*G01N 23/00*    (2006.01)

(52) U.S. Cl. .................. 250/234; 250/306; 73/105

(58) Field of Classification Search ............... 250/234, 250/216, 306, 307; 73/105
See application file for complete search history.

(56) References Cited

U.S. PATENT DOCUMENTS 5,939,719 A * 8/1999 Park et al. ............. 250/306

FOREIGN PATENT DOCUMENTS

| JP | 8-226928 | 9/1996 |
|---|---|---|
| JP | 2824463 | 9/1998 |

* cited by examiner

*Primary Examiner*—Kevin Pyo
(74) *Attorney, Agent, or Firm*—Scully, Scott, Murphy & Presser, P.C.

(57) ABSTRACT

An optical observation image obtained through an objective lens is displayed on a display unit, and a marker indicating a position of a tip portion of a cantilever is displayed on the optical observation image displayed on the display unit.

19 Claims, 4 Drawing Sheets

COMPOUND SCANNING PROBE MICROSCOPE

CROSS-REFERENCE TO RELATED APPLICATIONS

This application is based upon and claims the benefit of priority from prior Japanese Patent Application No. 2004-169961, filed Jun. 8, 2004, the entire contents of which are incorporated herein by reference.

BACKGROUND OF THE INVENTION

1. Field of the Invention

The present invention relates to a compound scanning probe microscope having functions of both an optical microscope which obtains an optical observation image of a sample through an objective lens and a scanning probe microscope which obtains a scanning probe observation image by scanning a cantilever over the sample.

2. Description of the Related Art

Conventionally, there are optical microscopes which can be easy to optically observe a sample having a micro size (hereinafter referred to as micro sample). Recently, in the observation of the micro sample, the scanning probe microscope (hereinafter referred to as SPM) which can observe the micro sample with resolution higher than that of the optical microscope is frequently used instead of the optical microscope.

There are compound microscopes having functions of the optical microscope and SPM. For example, Jpn. Pat. Appln. KOKAI Publication No. 8-226928 and Japanese Patent No. 2824463 disclose such the compound microscopes in which both the objective lens and a small-size SPM are attached to a revolver provided in a microscope main body. The optical observation with the optical microscope and SPM observation with small SPM having resolution higher than that of the optical microscope can be realized in one compound microscope.

In the case where the optical microscope is separated from SPM, it is necessary that the observation is performed by exchanging the sample between the optical microscope and SPM. On the contrary, in the compound microscope, the observation can be performed without exchanging the sample.

In Jpn. Pat. Appln. KOKAI Publication No. 8-226928, a target observation region in the sample is set by the objective lens attached to the revolver, and the cantilever is positioned at a center portion of an objective lens visual field while the cantilever of the SPM unit is observed through the objective lens. Further, the objective lens is switched to the SPM unit by rotating action of the revolver to obtain an SPM image near the target observation region with the SPM unit. According to Jpn. Pat. Appln. KOKAI Publication No. 8-226928, it is easy to position the target observation region and the cantilever of the SPM unit, and observer's usability is improved during the observation.

In Japanese Patent No. 2824463, in order to enhance correspondence between an observation visual field position of the objective lens and an SPM image obtaining position, a relationship between visual field positions is previously stored from the optical observation image obtained with the optical microscope and the SPM image obtained with the SPM unit. Further, in the case where the optical microscope is switched to the SPM unit after the observation with the optical microscope, offset movement of the sample is accomplished by the amount of position shift between the optical observation image and the SPM image. According to Japanese Patent No. 2824463, when the optical microscope is switched to the SPM unit, it is possible that the SPM unit observation position is caused to correspond to the optical microscope observation position.

BRIEF SUMMARY OF THE INVENTION

According to a principal aspect of the present invention, there is provided a compound scanning probe microscope comprising: an optical microscope which obtains an optical observation image of a sample through an objective lens; a scanning probe microscope which has a cantilever scanning the sample, the scanning probe microscope obtaining a scanning probe observation image of the sample by the scan of the cantilever; a display unit which displays the optical observation image or the scanning probe observation image; and a cantilever position display processing unit which displays a marker on the optical observation image displayed on the display unit, the marker indicating a position of the cantilever or a scan area of the cantilever.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Referring now to the drawings, a first embodiment of the invention will be described.

Figure 1:
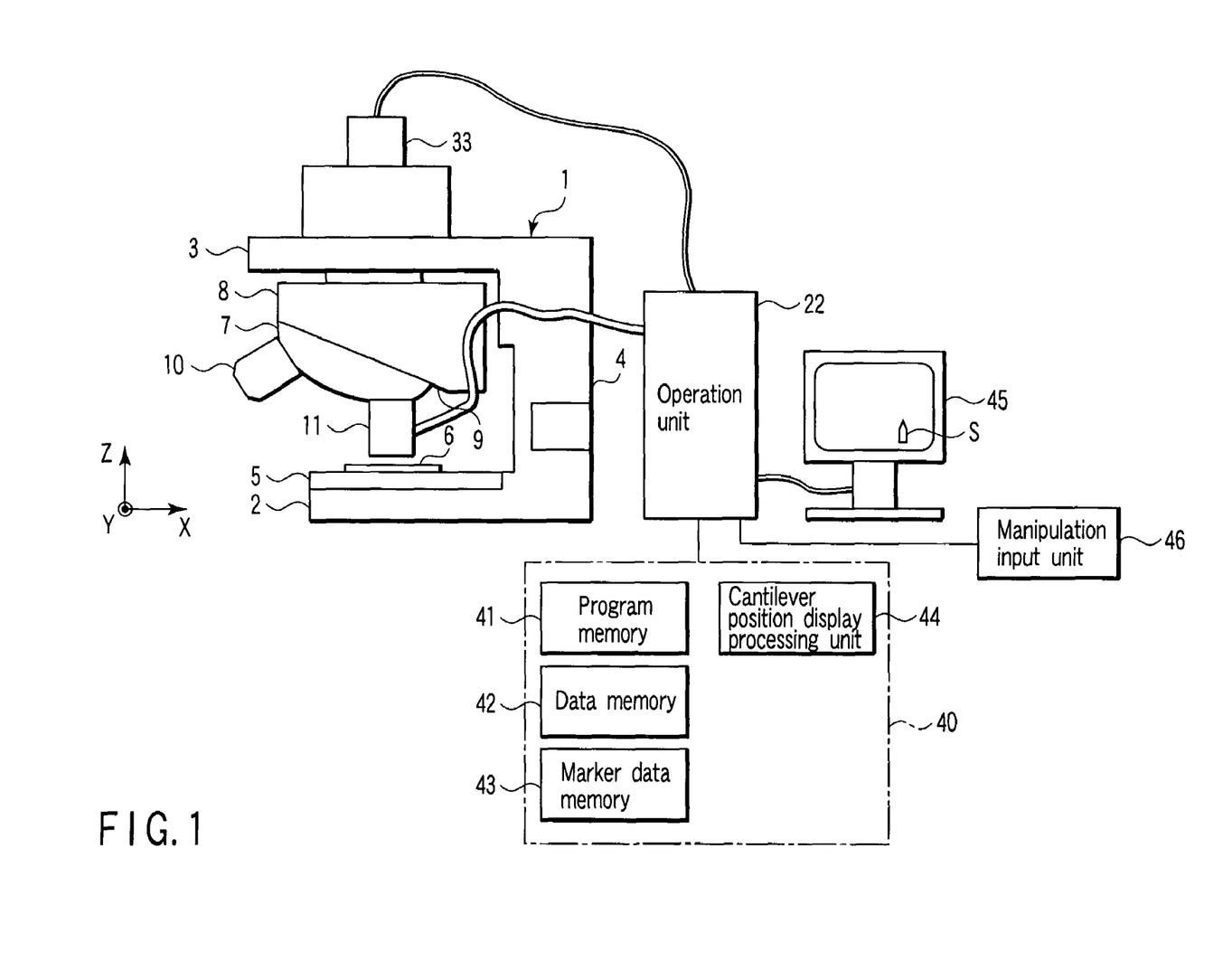
FIG. 1 is a schematic diagram showing a compound scanning probe microscope according to a first embodiment of the invention.

FIG. 1 shows a configuration of a compound scanning probe microscope (hereinafter referred to as compound SPM). A microscope frame 1 has a lower frame 2, an upper frame 3, and a support frame 4. The support frame 4 supports the lower frame 2 and the upper frame 3 while the lower frame 2 and the upper frame 3 are opposed vertically to each other. An XY stage 5 is provided on the lower frame 2. The XY stage 5 is movable in X and Y directions. A sample 6 is placed on the XY stage 5.

A revolver support portion 8 is provided in a lower surface of the upper frame 3. The revolver support portion 8 rotatably supports a revolver 7. The revolver 7 is provided while being rotatable with respect to a tilted support surface 9 of the revolver support portion 8. For example, an objective lens 10 of an optical microscope and a scanning probe microscope unit (hereinafter referred to as SPM unit) 11 are attached to the revolver 7. It is also possible that the plural objective lenses 10 having different magnifications are attached. Plural attachment holes for attaching the objective lens 10 and the SPM unit 11 are made in the revolver 7.

Figure 2:
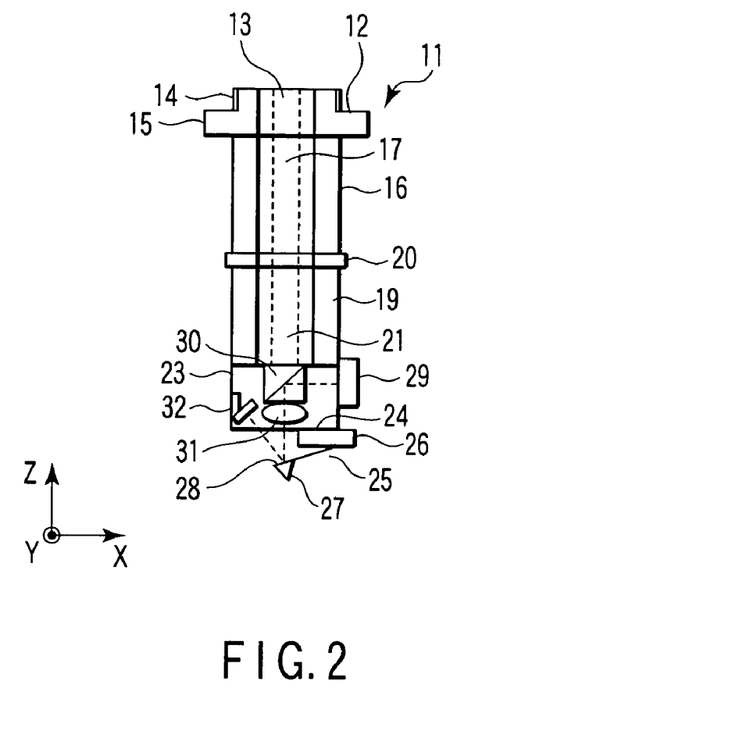
FIG. 2 is a schematic view showing an SPM unit in the compound scanning probe microscope.

FIG. 2 shows a configuration of the SPM unit 11. For example, an attachment portion 12 is formed in a ring shape while having a hollow portion 13. A screw portion 14 and an attachment stop portion 15 are provided in an outer peripheral surface of the attachment portion 12. The screw portion 14 is threaded. The screw portion 14 is threaded in the attachment hole of the revolver 7. The attachment stop portion 15 is provided on the lower side of the screw portion 14. The attachment stop portion 15 is formed so that an outer diameter is larger than that of the screw portion 14.

An XY-actuator 16 is provided in the attachment portion 12. The XY-actuator 16 is a cylindrical piezoelectric device formed in the cylindrical shape having a hollow portion 17. The XY-actuator 16 is coaxially provided with respect to the hollow portion 13 of the attachment portion 12. In the XY-actuator 16, micro displacement is generated in both the X and Y directions by applying voltage from the later-mentioned operation unit 22, which allows the scan to be performed in the X and Y directions.

A Z-actuator 19 is coupled to the XY-actuator 16 through a coupling member 20. The Z-actuator 19 is a cylindrical piezoelectric device formed in a cylindrical shape having a hollow portion. The Z-actuator 19 is coaxially provided with respect to the hollow portion 17 of the XY-actuator 16 through the coupling member 20. In the Z-actuator 19, the micro displacement is generated in a Z direction by applying the voltage from the later-mentioned operation unit 22, which allows the scan to be performed in the Z direction. For example, the coupling member 20 is formed in the ring shape.

As shown in FIG. 1, the X and Y directions of the micro displacement in the XY-actuator 16 and the Z direction of the micro displacement in the Z-actuator 19 are the directions in the case where the SPM unit 11 is arranged while opposed to the sample 6.

A lens fixing member 23 is provided in a lower end portion of the Z-actuator 19. For example, the lens fixing member 23 is formed in the cylindrical shape. A displacement member 26 is attached to a lower end portion 24 of the lens fixing member 23. The displacement member 26 is formed by a piezoelectric device for excitation and the like. A cantilever 25 is attached to the displacement member 26.

A probe 27 is provided at a tip portion of the cantilever 25. The cantilever 25 is provided obliquely downward with respect to the displacement member 26. The probe 27 is sharp-pointed, e.g. the probe 27 is formed with a diameter of about 10 nm. The cantilever 25 is attachable to and detachable from the lower end portion 25 by the displacement member 26.

A laser oscillator device 29 such as a laser diode is provided on a side surface of the lens fixing member 23. A spectral member 30 such as a beam splitter is provided on an optical path of a laser beam oscillated from the laser oscillator device 29 and in the hollow portion of the lens fixing member 23. The laser beam oscillated from the laser oscillator device 29 is reflected downward by the spectral member 30.

A lens 31 is provided on a reflection optical path of the spectral member 30. The lens 31 is provided in the hollow portion of the lens fixing member 23. The lens 31 focuses the laser beam, reflected from the spectral member 30, onto a reflection plane 28 located on the backside of the cantilever 25.

A photodetector 32 is provided on the reflection optical path of the reflection plane 28 in the lens fixing member 23. The photodetector 32 receives the laser beam reflected from the reflection plane 28 of the cantilever 25 and outputs a position detection signal according to the laser beam reception position. In the photodetector 32, plural light-reception devices are arrayed in line. The light-reception devices of the photodetector 32 are arrayed along a locus of the reflection optical path of the laser beam from the reflection plane 28 which is reciprocally moved when the cantilever 25 is excited.

An image pickup device 33 such as a CCD camera is attached to an upper surface of the upper frame 3. The image pickup device 33 is attached on an observation optical path of the optical microscope. The observation optical path of the optical microscope is an optical axis which passes through the objective lens 10 when the objective lens 10 is set at the observation position by the rotation of the revolver 7. The observation position of the objective lens 10 is located at the position in which the objective lens 10 is opposed to the sample 6. The image pickup device 33 takes an image of the sample 6 through the objective lens 10 when the objective lens 10 of the optical microscope is set at the observation position by the rotation of the revolver 7.

On the other hand, the measuring position of the SPM unit 11 is located at the position in which SPM unit 11 is opposed to the sample 6 by the rotation of the revolver 7.

When the SPM unit 11 is set at the measuring position, the image pickup device 33 takes the image of the cantilever 25 through a group of hollow portions of the SPM unit 11 shown in FIG. 2, such as the hollow portion 13 of the attachment portion 12, the hollow portion 17 of the XY-actuator 16, and the hollow portion 21 of the Z-actuator 19, the spectral member 30, and the lens 31.

A operation unit 22 includes a computer, and the computer has CPU, a program memory, a data memory, a data input/output port, and the like. FIG. 1 shows a functional block 40 of the operation unit 22. The operation unit 22 has a program memory 41, a data memory 42, a marker data memory 43, and a cantilever position display processing unit 44. A display unit 45 and an manipulation input unit 46 are connected to the operation unit 22. For example, the display unit 45 has a liquid crystal display. The manipulation input unit 46 has a mouse, a keyboard, and the like, in order that an observer issues an operation command.

A shape measuring program and a cantilever position display program are stored in the program memory 41. The shape measuring program causes the computer to perform a process of measuring a surface shape of the sample 6 at atomic levels. In the process of measuring the surface shape, the excitation command is issued to the displacement member 26 of the cantilever 25 to cause the probe 27 to approach to the sample 6 while the probe is excited, and the surface shape of the sample 6 is measured by detecting interaction acting between the probe 27 and the sample 6 such as tunnel current or interatomic force. For example, a distance between the probe 27 and the sample 6 is of an nm ($1/10^9$ m) order or several angstroms when the probe 27 is caused to approach to the sample 6 while excited.

The cantilever position display program causes the computer to execute the following process. In the process, the image pickup device 33 takes the image of the later-mentioned alignment mark through the objective lens 10 while the revolver 7 is rotated to switch to objective lens 10, and the image data obtained by the image pickup device 33 is displayed on the display unit 45. Then, the image data obtained by the image pickup device 33 is computed to obtain alignment mark position information in the optical observation image. Then, while the revolver 7 is rotated to switch to the SPM unit 11, the image pickup device 33 takes the image of the cantilever 25. Then, the image data obtained by the image pickup device 33 is computed to obtain the position information of the cantilever 25. Then, the position information of the cantilever 25 is determined in the optical observation image by comparing the alignment mark position information and the position information of the cantilever 25. Then, according to the position information of the cantilever 25, the marker indicating the position of the cantilever 25 is displayed in the optical observation image displayed on the display unit 45.

Image data taken by the image pickup device 33 is stored in the data memory 42.

Figure 3A:
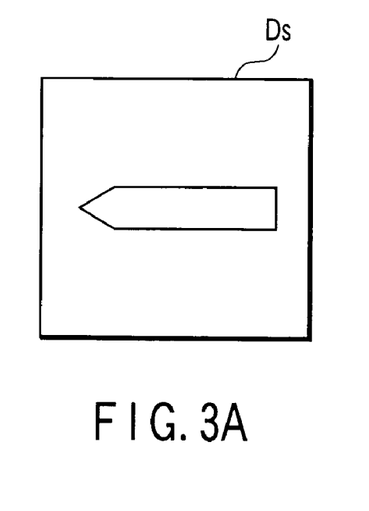
FIG. 3A is a schematic view of index image data in the compound scanning probe microscope.
Figure 3B:
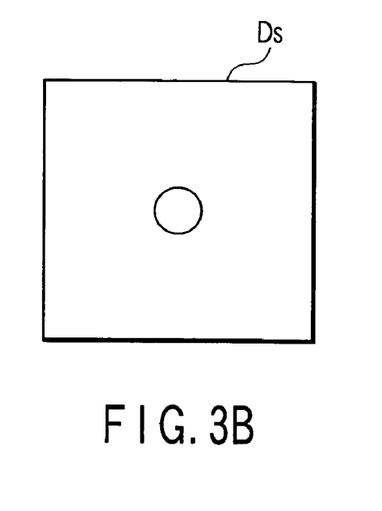
FIG. 3B is another piece of index image data in the compound scanning probe microscope.

Marker image data Ds indicating the position of the cantilever 25 is stored in the marker data memory 43. The marker image data Ds is displayed on the display unit 45. The marker image data Ds has the shape similar to the cantilever 25 as shown in FIG. 3A. The marker image data Ds may be formed in the round shape shown in FIG. 3B or in the shape of "X". Further, the marker image data Ds is formed in the desired shapes such as "Δ", "◯", "□", "☆", "↑", and "*".

The cantilever position display processing unit 44 reads the marker image data Ds stored in the marker data memory 43, and the cantilever position display processing unit 44 displays a marker S indicating the position of the cantilever 25, i.e. the position of the tip portion of the cantilever 25 (position of the probe 27) on the optical observation image, which is displayed on the display unit 45 and obtained through the objective lens 10.

Figure 4:
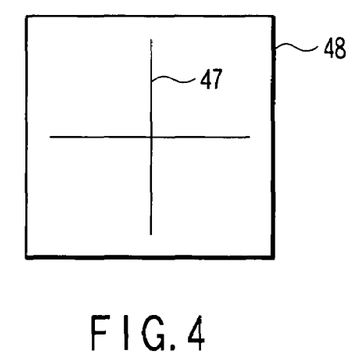
FIG. 4 is a view showing an alignment mark used in the compound scanning probe microscope.

A technique of displaying the marker S in the optical observation image on the display unit 45 will be described. For example, an alignment sample 48 shown in FIG. 4 is used. An alignment mark 47 is formed in the alignment sample 48 made of a light transmission material. For example, the alignment mark 47 is formed in a cross shape on the alignment sample 48. In addition to the cross shape, the alignment mark 47 may be formed in a circular shape, a concentric-circle shape, and the like as long as the position can be specified by alignment mark 47.

Instead of the sample 6, the alignment sample 48 is placed on the XY-stage 5. The image pickup device 33 takes the image of the alignment sample 48 through the objective lens 10. Therefore, in the optical observation image, the position information of the alignment mark 47 on the alignment sample 48 is obtained from the image data obtained by the image pickup device 33.

Then, while the objective lens 10 is set at the observation position, the image pickup device 33 takes the image of the alignment sample 48 through the objective lens 10 to output an image signal.

The image signal outputted from the image pickup device 33 is inputted to the cantilever position display processing unit 44. The cantilever position display processing unit 44 obtains the image data as first image data when the image of the alignment sample 48 is taken. The cantilever position display processing unit 44 determines the position information of the alignment mark 47 from the first image data.

On the other hand, while the SPM unit 11 is set at the measuring position, the image pickup device 33 takes the image of the alignment mark 47 on the cantilever 25 and the alignment sample 48 through the group of hollow portions of the SPM unit 11 shown in FIG. 2, such as the hollow portion 13 of the attachment portion 12, the hollow portion 17 of the XY-actuator 16, and the hollow portion 21 of the Z-actuator 19, the spectral member 30, and the lens 31. Then, the image pickup device 33 outputs the image signal.

The image signal outputted from the image pickup device 33 is inputted to the cantilever position display processing unit 44. The cantilever position display processing unit 44 obtains the image data as second image data when the image of the cantilever 25 is taken. The cantilever position display processing unit 44 determines the position information of the cantilever 25 in the second image data from the positional relationship between the cantilever 25 and the alignment mark 47.

The cantilever position display processing unit 44 determines the amount of shift from deviation between the position information of the alignment mark 47 in the first image data and the position information of the cantilever 25 in the second image data. According to the amount of shift, the cantilever position display processing unit 44 displays the marker S while overlaying the marker S indicating the tip portion of the cantilever 25 on the optical observation image displayed on the display unit 45.

Then, action of the cantilever position display in the compound SPM having the above-described configuration will be described.

In the compound SPM, coarse adjustment is previously performed. The coarse adjustment generates an overlapping portion between a visual field area of the objective lens 10 and the visual field area of the lens 31 of the SPM unit 11. High accuracy is not required in the coarse adjustment. The coarse adjustment is performed by the following adjustment method.

In the coarse adjustment, it is necessary that the visual field area of the objective lens 10 and the visual field area of the lens 31 of the SPM unit 11 overlap each other. For example, the coarse adjustment can sufficiently be achieved in mechanical accuracy. In the case where the coarse adjustment cannot be achieved in mechanical accuracy, both or either the objective lens 10 or the SPM unit 11 is adjusted so that the visual field areas overlap each other.

The adjustment method of overlapping the visual field areas of the objective lens 10 and the lens 31 of the SPM unit 11 is not limited to the above method, but other methods may be adopted.

Then, pre-adjustment is performed. For example, the alignment sample 48 in which the alignment mark 47 shown in FIG. 4 is formed is placed on the XY-stage 5. The objective lens 10 is set on the observation optical path by the rotation of the revolver 7. The image pickup device 33 takes the image of the alignment mark 47 through the objective lens 10 to output the image signal.

The image signal of the alignment mark 47, which is outputted from the image pickup device 33, is inputted to the cantilever position display processing unit 44. The cantilever position display processing unit 44 stores first image data of the alignment mark 47 shown in FIG. 5A in the data memory 42.

The position of the alignment sample 48 is not changed. The SPM unit 11 is set at the measuring position by the rotation of the revolver 7. The image pickup device 33 takes the images of the cantilever 25 and the alignment mark 47 through the group of hollow portions of the SPM unit 11, the spectral member 30, and the lens 31. Then, the image pickup device 33 outputs the image signals of the cantilever 25 and the alignment mark 47.

The image signals outputted from the image pickup device 33 is inputted to the cantilever position display processing unit 44. The cantilever position display processing unit 44 stores second image data of the alignment mark 47 shown in FIG. 5B in the data memory 42.

Figure 5A:
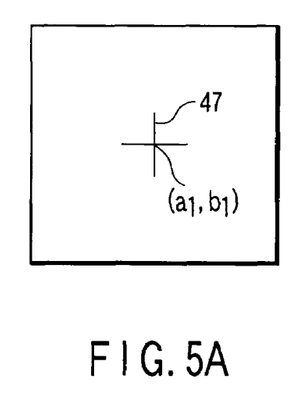
FIG. 5A is a schematic view showing a center position of a visual field of an objective lens in the compound scanning probe microscope.
Figure 5B:
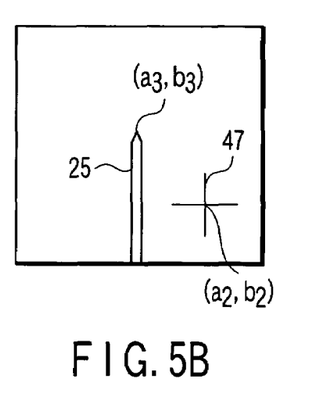
FIG. 5B is a schematic view showing the center position of a measuring range of the SPM unit in the compound scanning probe microscope.

The position of the alignment sample 48 is not changed. As shown in FIG. 5A, the cross position of the alignment mark 47 on the first image data obtained through the objective lens 10 becomes $(a_1, b_1)$. As shown in FIG. 5B, the cross position of the alignment mark 47 on the second image data obtained through the group of hollow portions of the SPM unit 11 becomes $(a_2, b_2)$.

Accordingly, the amount of shift between a position $(a_3, b_3)$ of the cantilever 25 and the cross position $(a_2, b_2)$ on the second image data obtained through the group of hollow portions of the SPM unit 11 becomes the shift amount $(X_1, Y_1)$ between the visual field of the objective lens 10 and the measuring range of the SPM unit 11.

The cantilever position display processing unit 44 computes a real distance of the amount of shift between the visual field of the objective lens 10 and the measuring range of the SPM unit 11 by performing conversion the shift amount $(X_1, Y_1)$ using the magnifications of the objective lens 10 and the SPM unit 11. Then, the cantilever position display processing unit 44 computes the position of the measuring range of the SPM unit 11 displayed on the optical observation image using the real distance of the amount of shift from the cross position $(a_1, b_1)$ on the fist image data obtained through the objective lens 10.

The action, in which the marker S indicating the position of the tip portion of the cantilever 25 is displayed in the optical observation image, displayed on the display unit 45 and obtained through the objective lens 10, will be described below.

When the sample 6 is observed, the sample 6 is placed on the XY-stage 5. The objective lens 10 is set on the observation optical path by the rotation of the revolver 7. The image pickup device 33 takes the image of the sample 6 through the objective lens 10 to output the image signal of the sample 6. The image signal outputted from the image pickup device 33 is inputted to the operation unit 22, and the operation unit 22 performs image processing to the image of the sample 6 to display the image on the display unit 45 in real time.

In the pre-adjustment, the real distance of the amount of shift between the visual field of the objective lens 10 and the measuring range of the SPM unit 11 is stored in the data memory 42.

Figure 6:
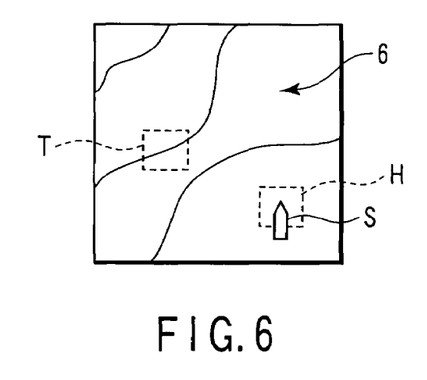
FIG. 6 is a view showing a state, in which a marker indicating a position of a cantilever tip portion is shown on a display in which an optical observation image is shown in real time with the compound scanning probe microscope.

The cantilever position display processing unit 44 displays the optical observation image, obtained through the objective lens 10, on the display unit 45 in real time. In the state of things, the cantilever position display processing unit 44 reads the marker image data Ds stored in the marker data memory 43 while reading the real distance of the amount of shift stored in the data memory 42. As shown in FIG. 6, the cantilever position display processing unit 44 displays the marker S indicating the position of the tip portion of the cantilever 25 on the display unit 45 according to the real distance of the amount of shift.

In the state in which the optical observation image of the sample 6 is displayed on the display unit 45 in real time, the marker S indicating the position of the tip portion of the cantilever 25 is displayed while overlaid on the optical observation image. While the observer observes the optical observation image of the sample 6, the observer can confirm an SPM image obtaining area H when switching to the SPM unit 11. The SPM image obtaining area H is determined based on the position of the cantilever 25, i.e. the position of the tip portion of the cantilever 25.

Accordingly, the compound microscope is in the observation state in which the optical observation image of the sample 6 is displayed on the display unit 45. In the state of things, assuming that the desired region where the SPM image is obtained, e.g. a region T shown in FIG. 6 exists in the optical observation image of the sample 6, the XY-stage 5 is moved to the X and Y directions, which moves the desired region T to the position of the marker S indicating the position of the tip portion of the cantilever 25. Then, the revolver 7 is rotated to set the SPM unit 11 at the measuring position.

In the desired region T, the SPM unit 11 causes the probe 27 of the cantilever 25 to approach to the sample 6 while exciting the probe 27 at the distance between the probe 27 and the sample 6 which is of the nm ($1/10^9$ m) order or several angstroms. When the probe 27 of the cantilever 25 is caused to approach to the sample 6 while excited, the SPM unit 11 detects the interaction, such as the tunnel current or the interatomic force, acting between the probe 27 and the sample 6.

The operation unit 22 measures the surface shape of the sample 6 at atomic levels based on the interaction detected by the SPM unit 11, such as the tunnel current or the interatomic force, acting between the probe 27 and the sample 6. The display unit 45 displays the SPM image of the desired region T measured by the operation unit 22.

Then, exchange of the cantilever 25 will be described.

The cantilever 25 provided in the lower end portion of the Z-actuator 19 is detached. The new cantilever 25 is provided in the lower end portion of the Z-actuator 19. The cantilever 25 has an error caused by production. Therefore, the position of the tip portion of the new cantilever 25 is shifted from the previous position of the tip portion of the cantilever 25.

The SPM unit 11, in which the new cantilever 25 is provided, is set at the measuring position by the rotation of the revolver 7. In the state of things, the image pickup device 33 takes the image of the cantilever 25 through the group of hollow portions of the SPM unit 11, the spectral member 30, and the lens 31 to output the image signal.

Figure 7:
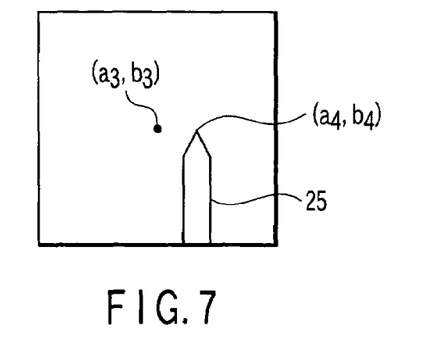
FIG. 7 is a schematic view showing an image of the cantilever tip portion shown on the display with the compound scanning probe microscope.

The image signals outputted from the image pickup device 33 is inputted to the cantilever position display processing unit 44. The cantilever position display processing unit 44 stores the second image data of the tip portion of the cantilever 25 in the data memory 42. At the same time, as shown in FIG. 7, the cantilever position display processing unit 44 displays the image of the tip portion of the cantilever 25 on the display unit 45.

The observer issues the command to the manipulation input unit 46 about the position of the tip portion of the cantilever 25 while monitoring the image of the cantilever 25 displayed on the display unit 45. The observer clicks the position of the tip portion of the cantilever 25 using the manipulation input unit 46 such as the mouse and the like.

The position command is inputted from the manipulation input unit 46 to the cantilever position display processing unit 44. The cantilever position display processing unit 44 computes and determines a position $(a_4, b_4)$ of the tip portion of the cantilever 25 in the image data as shown in FIG. 7.

Then, the cantilever position display processing unit 44 reads the pre-exchange position $(a_3, b_3)$ of the cantilever 25 from the data memory 42. The cantilever position display processing unit 44 determines deviation $(a_3-a_4, b_3-b_4)$ between the pre-exchange position $(a_3, b_3)$ and the post-exchange position $(a_4, b_4)$ of the cantilever 25.

Then, the cantilever position display processing unit 44 corrects a coordinate position of the marker S indicating the position of the tip portion of the cantilever 25, displayed on the display unit 45, using the deviation $(a_3-a_4, b_3-b_4)$.

The cantilever position display processing unit 44 displays the optical observation image, obtained through the objective lens 10, on the display unit 45 in real time. The cantilever position display processing unit 44 also displays the marker S indicating the position of the tip portion of the new cantilever 25 in the optical observation image according to the corrected coordinate position.

Accordingly, even after the cantilever 25 is exchanged to new one, the marker S indicating the position of the tip portion of the cantilever 25 newly exchanged is displayed on the display unit 45 while overlaid on the optical observation image of the sample 6 displayed in real time.

Thus, according to the first embodiment, while the optical observation image obtained through the objective lens 10 is displayed on the display unit 45 in real time, the marker S indicating the position of the tip portion of the cantilever 25 can be displayed on the display unit 45. Therefore, the observer can confirm the measuring range of the SPM unit 11, i.e. the SPM image obtaining area H in the optical observation image when switching from the objective lens 10 to the SPM unit 11. As shown in FIG. 6, the observer moves the desired region T where the SPM image is obtained in the sample 6 to the marker S by driving the XY-stage 5 in the X and Y directions, which allows the SPM image of the desired region T to be securely displayed on the display unit 45 in switching from the objective lens 10 to the SPM unit 11. As a result, efficiency can be improved during the observation of the sample 6 in switching between the objective lens 10 and the SPM unit 11.

When the cantilever 25 is exchanged to new one, the position of the tip portion of the cantilever 25 is shifted due to the error of the production. In order to prevent the error of the production, according to the first embodiment, the position where the marker S is displayed is corrected based on the deviation $(a_3-a_4, b_3-b_4)$ between the pre-exchange position $(a_3, b_3)$ of the cantilever 25 and the position $(a_4, b_4)$ of the tip portion of the new cantilever 25. As a result, the marker S indicating the position of the tip portion of the cantilever 25 newly exchanged can accurately be displayed.

In order to display the SPM image of the desired region T on the display unit 45, only the desired region T where the SPM image is obtained by driving the XY-stage 5 in the X and Y directions is moved to the marker S. Unlike the prior art, an expensive electric stage is not required in order to offset the sample by the amount of position shift between the optical observation image and the SPM image. The time and trouble, in which the complicated image processing is performed to the optical observation image and the SPM image respectively to perform the alignment and correction values corresponding to the amounts of the position shift of the optical observation image and the SPM image are computed to operate the electric stage, are not required. Thus, according to the first embodiment, the time when the observation with the objective lens 10 is switched to the measurement with the SPM unit 11 can be shortened.

Figure 5C:
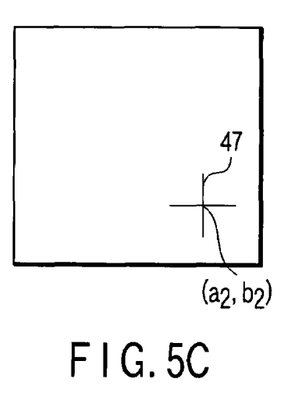
FIG. 5C is a schematic view showing image data obtained by performing SPM measurement to an alignment sample with the compound scanning probe microscope.

In the first embodiment, the second image data of the alignment mark 47 is obtained such that the image pickup device 33 takes the image of the alignment mark 47 through the group of the hollow portions of SPM unit 11, the spectral member 30, and the lens 31. It is also possible that the image data of the alignment mark 47 is obtained by actually performing the SPM measurement to the alignment sample 48. In this case, the cantilever 25 is not displayed in the second image data, but only the alignment mark 47 is displayed as shown in FIG. 5C. Namely, since the SPM measurement is performed with the cantilever 25, the cantilever 25 is not displayed. The position of the cantilever 25 is located at the center position of the second image data, and the center position $(a_3, b_3)$ of the second image data is used when the amount of shift and the like are computed.

Referring to the drawings, a second embodiment of the invention will be described below. In the second embodiment, the same component as for the first embodiment is indicated by the same reference numeral, and the detail description of the same component will not be repeated.

Figure 8:
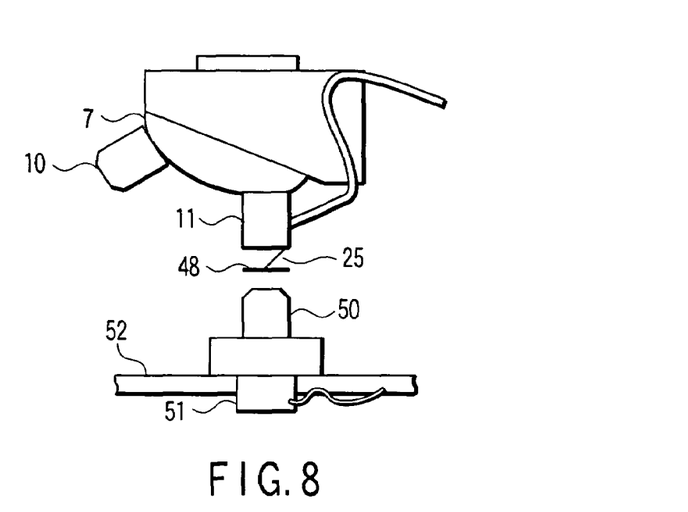
FIG. 8 is a partial schematic view showing a compound scanning probe microscope according to a second embodiment of the invention.

FIG. 8 is a partial schematic view showing feature portions of a compound SPM. An opposed-side objective lens 50 is provided while opposed to the SPM unit 11. For example, the opposed-side objective lens 50 is provided below the SPM unit 11. A second image pickup device 51 is attached to the opposed-side objective lens 50. The image pickup device 33 shown in FIG. 1 is referred to as the first image pickup device 33. The opposed-side objective lens 50 and the second image pickup device 51 are provided on an XY-stage 52. The opposed-side objective lens 50 and the second image pickup device 51 are an adjustment jig integrally formed.

Then, the action of the cantilever position display in the compound SPM having the above configuration will be described.

In the compound SPM of the second embodiment, as with the first embodiment, the coarse adjustment is previously performed. The coarse adjustment generates the overlapping portion between the visual field area of the objective lens 10 and the visual field area of the lens 31 of the SPM unit 11.

As with the first embodiment, the high accuracy is not required in the coarse adjustment. It is necessary that the visual field area of the objective lens 10 and the visual field area of the lens 31 of the SPM unit 11 overlap each other. For example, the coarse adjustment can sufficiently be achieved in mechanical accuracy. In the case where the coarse adjustment cannot be achieved in mechanical accuracy, the objective lens 10 and the SPM unit 11 are adjusted respectively so that the visual field areas overlap each other. The coarse adjustment method is not limited to the above method, but other methods may be adopted.

One of the adjustment methods will be described below.

The alignment sample 48 shown in FIG. 4 is placed on the XY-stage 5. The first image pickup device 33 takes the image of the alignment mark 47 through the objective lens 10 to output the image signal. The image signal outputted from the first image pickup device 33 is inputted to the operation unit 22, and the operation unit 22 performs the image processing to the image of the alignment mark 47 to display the image on the display unit 45.

The observer monitors the alignment mark 47 displayed on the display unit 45. The observer aligns the alignment mark 47 with the visual field center of the objective lens 10, for example, by moving the XY-stage 5 in the X and Y directions while monitoring the alignment mark 47.

The second image pickup device 51 takes the image of the alignment mark 47 through the opposed-side objective lens 50 to output the image signal. The image signal outputted from the second image pickup device 51 is inputted to the operation unit 22, and the operation unit 22 performs the image processing to the image of the alignment mark 47 to display the image on the display unit 45.

The observer monitors the alignment mark 47 displayed on the display unit 45. The observer aligns the cross of the alignment mark 47 with the visual field center of the opposed-side objective lens 50, for example, by moving the XY-stage 52 in the X and Y directions while monitoring the alignment mark 47.

The image signal outputted from the second image pickup device 51 is inputted to the operation unit 22, and the operation unit 22 stores the image data of the cross position of the alignment mark 47 as the first image data in the data memory 42. The alignment mark 47 is aligned in the visual field center of the opposed-side objective lens 50.

The SPM unit 11 is set at the measuring position by the rotation of the revolver 7. The first image pickup device 33 takes the image of the cantilever 25 through the group of hollow portions of the SPM unit 11, the spectral member 30, and the lens 31 to output the image signal. The image signal outputted from the first image pickup device 33 is inputted to the operation unit 22, and the operation unit 22 displays the image of the tip portion of the cantilever 25 on the display unit 45.

The observer adjust the position of the cantilever 25 so that the tip portion of the cantilever 25 is located at the visual field center of the lens 31 while monitoring the image of the cantilever 25 displayed on the display unit 45.

The second image pickup device 51 takes the image of the tip portion of the cantilever 25 through the opposed-side objective lens 50 to output the image signal.

The operation unit 22 displays the first image data on the display unit 45 by reading the first image data stored in the data memory 42. At the same time, the operation unit 22 inputs the image signal outputted from the second image pickup device 51, and the operation unit 22 displays the image of the tip portion of the cantilever 25 on the display unit 45. The image of the tip portion of the cantilever 25 is obtained in real time through the opposed-side objective lens 50. Therefore, the cross position image of the alignment mark 47, taken through the opposed-side objective lens 50, and the image of the tip portion of the cantilever 25, obtained in real time through the opposed-side objective lens 50, are displayed on the display unit 45 while the cross position image is overlaid on the image of the tip portion of the cantilever 25.

The observer adjusts the position of the SPM unit 11 so that the cross position of the alignment mark 47 is overlaid on the tip portion of the cantilever 25 while monitoring the cross position of the alignment mark 47 and the image of the tip portion of the cantilever 25, which are displayed on the display unit 45.

Then, as with the first embodiment, the pre-adjustment is performed. Therefore, the shift amount $(X_1, Y_1)$ between the visual field of the objective lens 10 and the measuring range of the SPM unit 11 is stored in the data memory 42.

Then, the action in which the marker S indicating the position of the tip portion of the cantilever 25 is displayed in the optical observation image, displayed on the display unit 45 and obtained through the objective lens 10, will be described below.

In the pre-adjustment, the shift amount $(X_1, Y_1)$ between the visual field of the objective lens 10 and the measuring range of the SPM unit 11 is stored in the data memory 42.

The cantilever position display processing unit 44 displays the optical observation image, obtained through the objective lens 10, on the display unit 45 in real time. In the state of things, the cantilever position display processing unit 44 reads the marker image data Ds stored in the marker data memory 43 while reading the shift amount $(X_1, Y_1)$ stored in the data memory 42. As shown in FIG. 6, the cantilever position display processing unit 44 displays the marker S indicating the position of the tip portion of the cantilever 25 on the display unit 45 according to the shift amount $(X_1, Y_1)$.

Then, the exchange of the cantilever 25 will be described.

The SPM unit 11, in which the new cantilever 25 is provided, is set at the measuring position by the rotation of the revolver 7. In the state of things, the second image pickup device 51 takes the image of the cantilever 25 through the opposed-side objective lens 50 to output the image signal.

The image signals outputted from the second image pickup device 51 is inputted to the cantilever position display processing unit 44. The cantilever position display processing unit 44 stores the second image data of the tip portion of the cantilever 25 in the data memory 42. At the same time, as shown in FIG. 7, the cantilever position display processing unit 44 displays the image of the tip portion of the cantilever 25 on the display unit 45.

The observer issues the command to the manipulation input unit 46 about the position of the tip portion of the cantilever 25 while monitoring the image of the cantilever 25 displayed on the display unit 45. The observer clicks the position of the tip portion of the cantilever 25 using the manipulation input unit 46 such as the mouse and the like.

The position command is inputted from the manipulation input unit 46 to the cantilever position display processing unit 44. The cantilever position display processing unit 44 computes and determines the coordinate $(a_4, b_4)$ of the tip portion of the cantilever 25 in the second image data as shown in FIG. 7.

Then, the cantilever position display processing unit 44 reads the pre-exchange position $(a_3, b_3)$ of the cantilever 25 from the data memory 42. The cantilever position display processing unit 44 determines the deviation $(a_3-a_4, b_3-b_4)$ between the pre-exchange position $(a_3, b_3)$ and the post-exchange position $(a_4, b_4)$ of the cantilever 25.

Then, the cantilever position display processing unit 44 corrects the position of the marker S indicating the position of the tip portion of the cantilever 25, displayed on the display unit 45, using the deviation ($a_3$–$a_4$, $b_3$–$b_4$). The optical observation image of the sample 6 is displayed on the display unit 45 in real time.

The cantilever position display processing unit 44 displays the optical observation image, obtained through the objective lens 10, on the display unit 45 in real time. In the state of things, the cantilever position display processing unit 44 displays the marker S indicating the position of the tip portion of the new exchanged cantilever 25 on the display unit 45 while overlaying the marker S on the optical observation image according to the corrected position.

Thus, according to the second embodiment, even if the opposed-side objective lens 50 is provided while opposed to the SPM unit 11, the same effects as for the first embodiment can be obtained.

The invention is not limited to the embodiments, but various modifications may be made.

Figure 9:
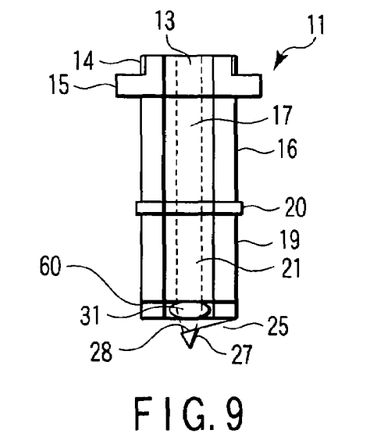
FIG. 9 is a schematic view showing a modification of the SPM unit in the compound scanning probe microscope according to the invention.

As shown in FIG. 9, in the SPM unit 11, a circular lens fixing member 60 is provided at the tip portion of the Z-actuator 19. The lens 31 is provided in the lens fixing member 60. The cantilever 25 having the probe 27 is provided in the lens fixing member 60.

In the above configuration, for example, the image pickup device 33 takes the image of the alignment mark 47 through the objective lens 10 to output the image signal. The alignment mark 47 taken through the objective lens 10 is displayed on the display unit 45.

The observer aligns the alignment mark 47 with the visual field center of the objective lens 10 by moving the XY-stage 5 in the X and Y directions. Then, the image signal outputted from the image pickup device 33 is inputted to the operation unit 22, and the operation unit 22 stores the cross coordinate of the alignment mark 47 from the image data in the data memory 42. For example, the cross position of the alignment mark 47 obtained through the objective lens 10 is ($a_1$, $b_1$) as shown in FIG. 5A.

The image pickup device 33 takes the images of the cantilever 25 and the alignment mark 47 through the group of hollow portions of the SPM unit 11 and the lens 31. The image signal outputted from the image pickup device 33 is inputted to the operation unit 22, and the operation unit 22 stores the image data in the data memory 42. For example, the position of the cantilever 25 and the cross position of the alignment mark 47, obtained through the group of hollow portions of the SPM unit 11, are ($a_3$, $b_3$) and ($a_2$, $b_2$) as shown in FIG. 5B respectively.

Accordingly, the amount of shift between the position ($a_3$, $b_3$) of the cantilever 25 and the cross position ($a_2$, $b_2$) of the alignment mark 47, obtained through the group of hollow portions of the SPM unit 11, becomes the shift amount ($X_1$, $Y_1$) between the visual field of the objective lens 10 and the measuring range of the SPM unit 11. The shift amount ($X_1$, $Y_1$) is stored in the data memory 42.

Therefore, not only the cantilever position display processing unit 44 displays the optical observation image, obtained through the objective lens 10, on the display unit 45 in real time, but also the cantilever position display processing unit 44 displays the marker S indicating the position of the tip portion of the cantilever 25 on the display unit 45 while the marker S is overlaid on the optical observation image according to the shift amount ($X_1$, $Y_1$) as shown in FIG. 6.

In the case of the exchange of the cantilever 25, the operation unit 22 corrects the position where the marker S is displayed based on the deviation ($a_3$–$a_4$, $b_3$–$b_4$) between the pre-exchange position ($a_3$, $b_3$) of the tip portion of the cantilever 25 and the new position ($a_4$, $b_4$) of the tip portion of the cantilever 25.

The cantilever position display processing unit 44 displays the marker S indicating the position of the tip portion of the new exchanged cantilever 25 on the display unit 45 while overlaying the marker S on the optical observation image according to the corrected position.

The marker S is not limited to the tip portion of the cantilever 25, but a symbol expressing the whole shape of the cantilever 25 may be used as the marker S. For example, the marker S may indicate the tip portion of the cantilever 25 by the cross shape or the ring shape. The position of the cantilever 25 of itself may be shown by the marker S. The position of the cantilever 25 may be shown by the marker S so that the scanning range is included.

When the magnification of the objective lens 10 is changed, the position of the marker S is determined by correcting the position of the marker S according to a ratio of the change in magnification of the objective lens 10.

For the method of recognizing the position of the tip portion of the cantilever 25, for example, a reference sample such as the alignment mark 47 is placed on the XY-stage 5, the image data of the alignment mark 47 is obtained by the SPM unit 11, and the image data of the alignment mark 47 is obtained through the objective lens 10.

Then, the image data of the alignment mark 47 obtained by the SPM unit 11 is overlaid on the image data of the alignment mark 47 obtained through the objective lens 10. The position of the tip portion of the cantilever 25 may be confirmed from the overlaid image data on the display unit 24 to issue the input command of the position the tip portion of the cantilever 25 from the manipulation input unit 46 such as the mouse.

In the first embodiment, the alignment mark 47 may be formed by a light-reflection member such as a mirror.

In addition to the usually known optical microscope including the already-existing microscope, the optical microscope which obtains the sample optical observation image through the objective lens should include all the microscopes, such as a scanning laser microscope (LSM), a disk scan type confocal microscope, and a scanning electron microscope, which have the resolution lower than the resolution obtained by the scanning probe microscope. Further, the optical microscope should also include the microscopes which observe living samples.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A compound scanning probe microscope comprising:
    an optical microscope which obtains an optical observation image of a sample through an objective lens;
    a scanning probe microscope which has a cantilever scanning the sample, the scanning probe microscope obtaining a scanning probe observation image of the sample by the scan of the cantilever;
    a display unit which displays the optical observation image or the scanning probe observation image; and
    a cantilever position display processing unit which displays a marker on the optical observation image displayed on the display unit, the marker indicating a position of the cantilever or a scan area of the cantilever.

2. A compound scanning probe microscope according to claim 1, wherein the cantilever position display processing unit displays the marker on the display unit based on an amount of shift between a visual field position of the objective lens and an observation position of the scanning probe microscope.

3. A compound scanning probe microscope according to claim 1, further comprising an image pickup device which takes an image of the cantilever,
wherein the cantilever position display processing unit computes the position of the marker displayed in the optical observation image based on position information of the cantilever obtained by the image pickup device.

4. A compound scanning probe microscope according to claim 1, further comprising:
an alignment mark; and
an image pickup device which takes the image of the alignment mark through the objective lens of the optical microscope,
wherein the cantilever position display processing unit determines the position information of the cantilever in the optical observation image based on the amount of shift between the position information of the alignment mark in the optical observation image obtained by the image pickup device through the objective lens of the optional microscope and the position information of the alignment mark obtained by measurement of the scanning probe microscope, and displays the marker in the optical observation image displayed on the display unit according to the position information of the cantilever.

5. A compound scanning probe microscope according to claim 4, wherein the cantilever position display processing unit previously stores the position information of the alignment mark when the observation is performed through the objective lens.

6. A compound scanning probe microscope according to claim 1, further comprising:
an alignment mark;
a revolver to which the objective lens and a scanning probe microscope unit is attached, the scanning probe microscope unit having the cantilever, the revolver switching between the objective lens and the scanning probe microscope unit;
an image pickup device which takes the image of the alignment mark through the objective lens of the optical microscope or takes the alignment mark through the scanning probe microscope, and
wherein the cantilever position display processing unit computes and determines the position information of the cantilever in the optical observation image displayed on the display unit based on first image data of the alignment mark obtained by the image pickup device through the objective lens and second image data obtained by the image pickup device through the scanning probe microscope unit, and displays the marker in the optical observation image displayed on the display unit.

7. A compound scanning probe microscope according to claim 1, wherein the marker has a shape similar to the cantilever, a circular shape, or the desired shape.

8. A compound scanning probe microscope according to claim 4, wherein the alignment mark is formed by a light-transmission member, and the alignment mark has a cross shape, the circular shape, a plurality of concentric circles, or a shape by which the position can be specified.

9. A compound scanning probe microscope according to claim 6, wherein the alignment mark is formed by the light-transmission member, and the alignment mark has the cross shape, the circular shape, the plurality of concentric circles, or the shape by which the position can be specified.

10. A compound scanning probe microscope according to claim 1, further comprising:
an alignment mark;
a revolver to which the objective lens and a scanning probe microscope unit is attached, the scanning probe microscope unit having the cantilever, the revolver switching between the objective lens and the scanning probe microscope unit;
a first image pickup device which takes the image of the alignment mark through the objective lens switched by the revolver;
an opposed-side objective lens which is arranged while opposed to the scanning probe microscope unit switched by the revolver; and
a second image pickup device which takes the image of the cantilever of the scanning probe microscope unit through the opposed-side objective lens,
wherein the cantilever position display unit computes and determines the position information of the cantilever in the optical observation image based on first image data of the alignment mark obtained by the first image pickup device and second image data of the cantilever obtained by the second image pickup device.

11. A compound scanning probe microscope according to claim 6, wherein the scanning probe microscope unit has:
a unit main body in which the cantilever is attachable to and detachable from a tip portion, the unit main body configured to be attachable to and detachable from the revolver, the unit main body being formed in a cylindrical shape having a hollow portion; and
a lens which is provided in the hollow portion at the tip portion of the unit main body.

12. A compound scanning probe microscope according to claim 10, wherein the scanning probe microscope unit has:
the unit main body in which the cantilever is attachable to and detachable from the tip portion, the unit main body configured to be attachable to and detachable from the revolver, the unit main body being formed in the cylindrical shape having the hollow portion; and
a lens which is provided in the hollow portion at the tip portion of the unit main body.

13. A compound scanning probe microscope according to claim 11, wherein the image pickup device takes the image of the cantilever from the hollow portion of the unit main body through the lens.

14. A compound scanning probe microscope according to claim 12, wherein the image pickup device takes the image of the cantilever from the hollow portion of the unit main body through the lens.

15. A method of displaying a cantilever position of a compound scanning probe microscope, the method comprising:
determining an amount of shift between a visual field area of an objective lens attached to a revolver of the compound scanning probe microscope and a measuring range of a scanning probe microscope having a cantilever attached to the revolver; and
displaying a marker in an optical observation image displayed on display unit based on the amount of shift, the marker indicating a position of the cantilever or a scan area of the cantilever, the optical observation image being obtained through the objective lens.

16. A method of displaying a cantilever position of a compound scanning probe microscope, according to claim 15, further comprising:

obtaining position information of an alignment mark in the optical observation image when the alignment mark is observed through the objective lens;

switching from the objective lens to the scanning probe microscope unit by switching the revolver;

obtaining the position information of the alignment mark when the observation is performed through the scanning probe microscope unit;

determining the amount of shift between the position information of the alignment mark obtained through the objective lens and the position information of the alignment mark obtained through the scanning probe microscope unit; and displaying the marker in the optical observation image according to the amount of shift, the optical observation image being displayed on the display unit, the marker indicating the position of the cantilever or the scan area of the cantilever.

17. A method of displaying a cantilever position of a compound scanning probe microscope, according to claim 16, wherein the position information of the alignment mark is determined by taking an image of the alignment mark through the objective lens with an image pickup device to perform image processing to image data obtained by the image pickup device.

18. A method of displaying a cantilever position of a compound scanning probe microscope, according to claim 16, wherein the position information of the cantilever is determined by taking the image of the cantilever through a lens with the image pickup device to perform the image processing to the image data obtained by the image pickup device, the lens being provided in a cylindrical unit main body included in the scanning probe microscope unit.

19. A method of displaying a cantilever position of a compound scanning probe microscope, according to claim 15, further comprising:

obtaining the position information of the alignment mark in the optical observation image when the alignment mark is observed through the objective lens;

switching from the objective lens to the scanning probe microscope unit by switching the revolver;

obtaining the position information of the alignment mark when measurement is performed by the scanning probe microscope unit;

determining the amount of shift between the position information of the alignment mark obtained through the objective lens and the position information of the alignment mark obtained by the scanning probe microscope unit; and displaying the marker in the optical observation image according to the amount of shift, the optical observation image being displayed on the display unit, the marker indicating the position of the cantilever or the scan area of the cantilever.

* * * * *